(12) United States Patent
Davani et al.

(10) Patent No.: US 11,981,346 B2
(45) Date of Patent: May 14, 2024

(54) DRIVEWAY DEPARTURE ASSIST SYSTEM

(71) Applicants: Sina Davani, Troy, MI (US); Joseph Burtch, Lake Orion, MI (US); Nizar Ahamed, Farmington Hills, MI (US)

(72) Inventors: Sina Davani, Troy, MI (US); Joseph Burtch, Lake Orion, MI (US); Nizar Ahamed, Farmington Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 6 days.

(21) Appl. No.: 17/645,837

(22) Filed: Dec. 23, 2021

(65) Prior Publication Data

US 2023/0202505 A1 Jun. 29, 2023

(51) Int. Cl.
| | |
|---|---|
| *B60W 50/16* | (2020.01) |
| *B60W 30/18* | (2012.01) |
| *B60W 60/00* | (2020.01) |
| *G06V 20/56* | (2022.01) |
| *B60W 50/14* | (2020.01) |

(52) U.S. Cl.
CPC ...... *B60W 50/16* (2013.01); *B60W 30/18036* (2013.01); *B60W 60/001* (2020.02); *G06V 20/588* (2022.01); *B60W 2050/143* (2013.01); *B60W 2050/146* (2013.01); *B60W 2554/20* (2020.02)

(58) Field of Classification Search
CPC .......... B60W 50/16; B60W 30/18036; B60W 60/001; B60W 2050/143; B60W 2050/146; B60W 2554/20; G06V 20/588
See application file for complete search history.

(56) References Cited

U.S. PATENT DOCUMENTS

| | | |
|---|---|---|
| 2010/0117862 A1 | 5/2010 | Luft |
| 2012/0271514 A1* | 10/2012 | Lavoie ................. B62D 15/027 701/42 |
| 2016/0264132 A1* | 9/2016 | Paul ..................... B60W 30/06 |
| 2016/0318444 A1 | 11/2016 | Owens |
| 2017/0247030 A1* | 8/2017 | Rinaldo .......... B60W 30/18036 |
| 2019/0016331 A1 | 1/2019 | Carlson et al. |
| 2019/0315344 A1* | 10/2019 | Guibert De Bruet . B60W 30/09 |
| 2020/0156694 A1* | 5/2020 | Moshchuk ........... G05D 1/0231 |
| 2020/0180691 A1 | 6/2020 | Sandblom et al. |
| 2021/0080967 A1 | 3/2021 | Pettinger et al. |
| 2021/0146998 A1* | 5/2021 | Niewiadomski ......... B60D 1/62 |
| 2022/0410918 A1* | 12/2022 | Bharti ................... B60W 30/06 |

FOREIGN PATENT DOCUMENTS

| | | | |
|---|---|---|---|
| DE | 102013212708 A1 * | 12/2014 | ......... B62D 15/0285 |
| DE | 102015003964 A1 | 9/2016 | |

OTHER PUBLICATIONS

International Search Report dated Apr. 24, 2023 of International Application PCT/US2022/082200 claiming priority this application.

* cited by examiner

*Primary Examiner* — Mohamed Barakat

(57) ABSTRACT

A driveway departure system for a vehicle is disclosed and includes a processing device configured to define a path for backing the vehicle along a drivable surface of the driveway that maintains the vehicle on the drivable surface of the driveway and to operate a vehicle system to back the vehicle along the defined path and on the detected drivable surface.

18 Claims, 5 Drawing Sheets

DRIVEWAY DEPARTURE ASSIST SYSTEM

TECHNICAL FIELD

The present disclosure relates to driver assist and autonomous vehicle systems, and more specifically to a system and method for assisting a vehicle departing a driveway.

BACKGROUND

Vehicles may be equipped with a driver assist and/or autonomous vehicle operation system to operate a vehicle partially and/or fully independent of a vehicle operator. Such systems are intended to ease demands on a driver and simplify vehicle operation. Departing an unfamiliar driveway can be a challenging task as the drivable surface is difficult to determined for both the operator and an autonomous vehicle operating system.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A driveway departure system for a vehicle according to a disclosed exemplary embodiment includes, among other possible things, a processing device configured to define a path for backing the vehicle along a drivable surface of the driveway that maintains the vehicle on the drivable surface of the driveway and to operate a vehicle system to back the vehicle along the defined path and on the detected drivable surface.

Another exemplary embodiment of the foregoing driveway departure system includes a sensor array configured to detect the drivable surface of a driveway and provide information on the drivable surface to the processing device.

In another exemplary embodiment to any of the foregoing driveway departure systems, the processing device is further configured to generate of a map of objects and surfaces surrounding the vehicle and dynamically updating the map as the vehicle moves along the defined path.

In another exemplary embodiment to any of the foregoing driveway departure systems, the processing device is further configured to autonomously controlling operation of the vehicle to back the vehicle out of the driveway along the defined path.

In another exemplary embodiment to any of the foregoing driveway departure systems the processing device is further configured to generate prompts to assist a driver in backing the vehicle out of the driveway along the defined path.

In another exemplary embodiment to any of the foregoing driveway departure systems the prompts to assist the driver includes at least one of feedback through a steering wheel of the vehicle, projection of the defined path on a display device within the vehicle and actuation of a warning signal alerting the driver that the vehicle is deviating from the defined path.

Another exemplary embodiment to any of the foregoing driveway departure systems further includes recording a path taken by the vehicle when entering the driveway and the defining of the path for the departure of the vehicle based in part on the recorded path.

Another exemplary embodiment to any of the foregoing driveway departure systems further includes generating a prompt to a vehicle operator responsive to actuation of a vehicle ignition based on vehicle operation prior to parking the vehicle that are indicative of entering the driveway.

In another exemplary embodiment to any of the foregoing driveway departure systems, defining of the path for departure includes defining an end of the path at an end of the driveway and before entering an adjacent roadway.

A method of backing a vehicle departing a driveway according to another disclosed example embodiment includes, among other possible things, detecting a drivable surface of a driveway with a sensor system disposed on a vehicle, defining a path for backing the vehicle from the driveway that maintains the vehicle on the detected drivable surface of the driveway with a processing device disposed on the vehicle, and operating a vehicle system to back the vehicle from the driveway on the defined path and on the detected drivable surface.

Another example embodiment of the foregoing method of backing a vehicle departing a driveway further comprises autonomously controlling operation of the vehicle to back the vehicle out of the driveway along the defined path.

Another example embodiment of the foregoing method of backing a vehicle departing a driveway further comprises generating prompts to assist a driver in backing the vehicle out of the driveway along the defined path.

In another example embodiment of the foregoing method of backing a vehicle departing a driveway, the generating of prompts to assist the driver includes at least one of feedback through a steering wheel of the vehicle, projection of the defined path on a display device within the vehicle and actuation of a warning signal alerting the driver that the vehicle is deviating from the defined path.

In another example embodiment of the foregoing method of backing a vehicle departing a driveway, the detecting of the drivable surface further comprises generation of a map of objects and surfaces surrounding the vehicle and dynamically updating the map as the vehicle moves along the defined path.

In another example embodiment of the foregoing method of backing a vehicle departing a driveway, the sensor system comprises an array of perception sensors disposed about the vehicle.

Another example embodiment of the foregoing method of backing a vehicle departing a driveway further includes recording a path taken by the vehicle when entering the driveway and the defining of the path for the departure of the vehicle based in part on the recorded path.

Another example embodiment of the foregoing method of backing a vehicle departing a driveway further includes generating a prompt to a vehicle operator responsive to actuation of a vehicle ignition based on vehicle operation prior to parking the vehicle that are indicative of entering the driveway.

In another example embodiment of the foregoing method of backing a vehicle departing a driveway, the defining of the path for departure includes defining an end of the path at an end of the driveway and before entering an adjacent roadway.

Another example embodiment of the foregoing method of backing a vehicle departing a driveway further includes deactivating operation of the vehicle along the path in response to the vehicle driving forward above a predefined speed.

Another example embodiment of the foregoing method of backing a vehicle departing a driveway, further includes defining the path for departure to accommodate a trailer attached to the vehicle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
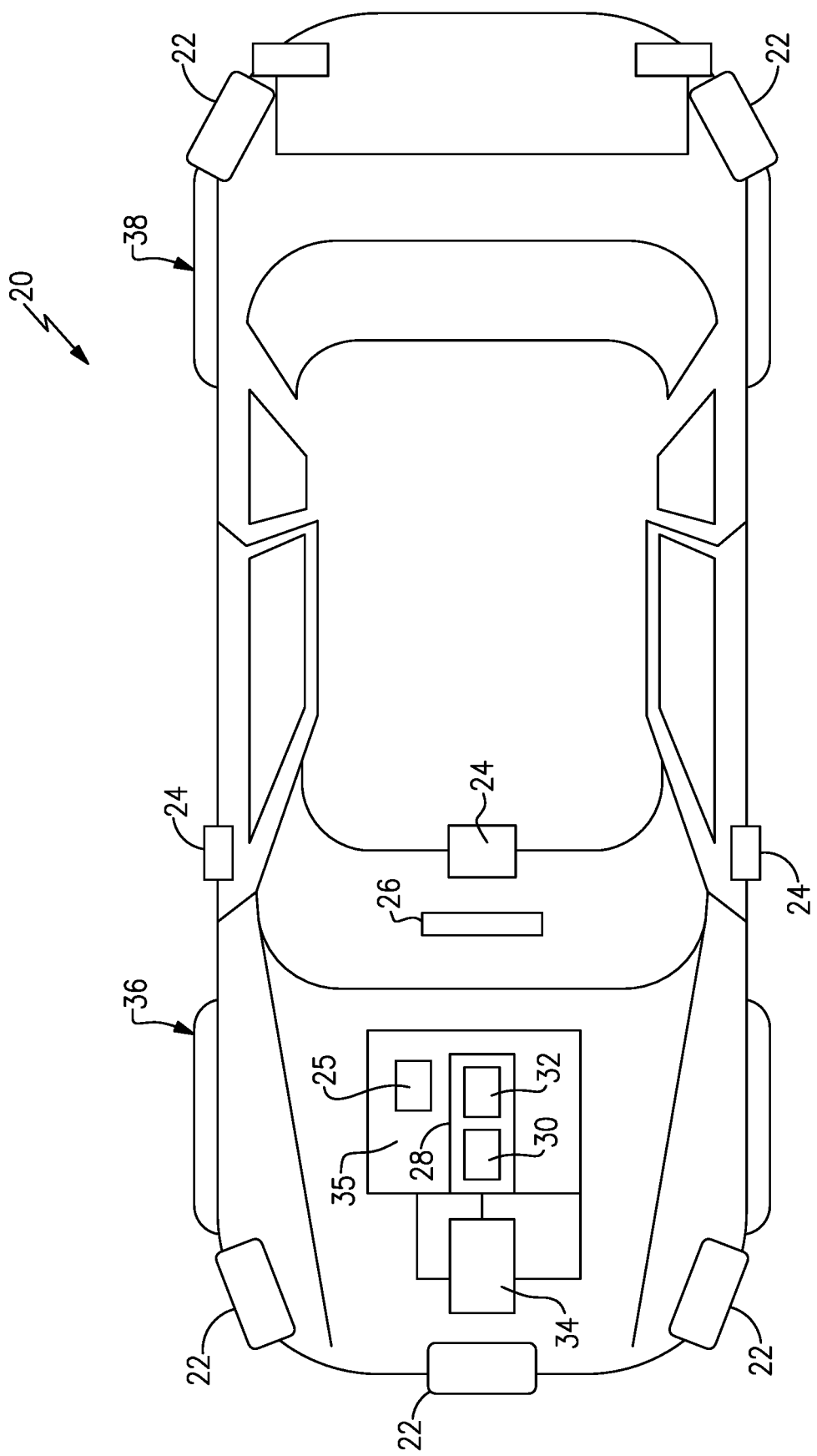
FIG. 1 is a schematic view of a vehicle including an example assisted driveway departure system embodiment.

Referring to FIG. 1, a vehicle 20 is shown schematically and includes a driveway departure system 25 for guiding a vehicle along drivable surfaces as the vehicle is backed out of a driveway. The disclosed driveway departure system 25 may autonomously operate the vehicle along a defined path or guide a vehicle operator such that the vehicle is backed out of the driveway without front wheels 36 or rear wheels 38 leaving a drivable surface. Backing out of an unfamiliar driveway can be challenging, even with rear view cameras and other devices providing a rear view to a vehicle operator.

The vehicle 20 includes radar devices 22 and cameras 24 that provide information about the surrounding environment such that a controller 28 may generate a map of drivable surfaces. The controller 28 includes a processing device 30 and a memory device 32. The controller 28 and the driver assist system 35 operate to control and/or provide input to at least one vehicle system 34. The vehicle system 34 may include braking, steering, lighting and propulsion systems of the vehicle 20. The example vehicle includes a display 26 that provides information to a vehicle operator as well as provide a human-machine interface (HMI) for operating systems of the vehicle 20.

The controller 28, processing device 30 and memory device 32 are schematically shown and may be part of an overall vehicle controller or a controller dedicated to the driver assist system 35. The controller 28 and the processing device 30 may be a hardware device for executing software, particularly software stored in the memory 32. The processing device 30 can be a custom made or commercially available processor, a central processing unit (CPU), an auxiliary processor among several processors associated with the computing device, a semiconductor based microprocessor (in the form of a microchip or chip set) or generally any device for executing software instructions.

The memory 32 can include any one or combination of volatile memory elements (e.g., random access memory (RAM, such as DRAM, SRAM, SDRAM, VRAM, etc.)) and/or nonvolatile memory elements. Moreover, the memory 32 may incorporate electronic, magnetic, optical, and/or other types of storage media. Note that the memory can also have a distributed architecture, where various components are situated remotely from one another, but can be accessed by the processor.

The software in the memory 32 may include one or more separate programs, each of which includes an ordered listing of executable instructions for implementing disclosed logical functions and operation. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Input/Output devices (not shown) that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the system 25 is in operation, the processor 30 may be configured to execute software stored within the memory 32, to communicate data to and from the memory 32, and to generally control operations of the system 25 pursuant to the software. Software in memory, in whole or in part, is read by the processor, perhaps buffered within the processor, and then executed.

Figure 2:
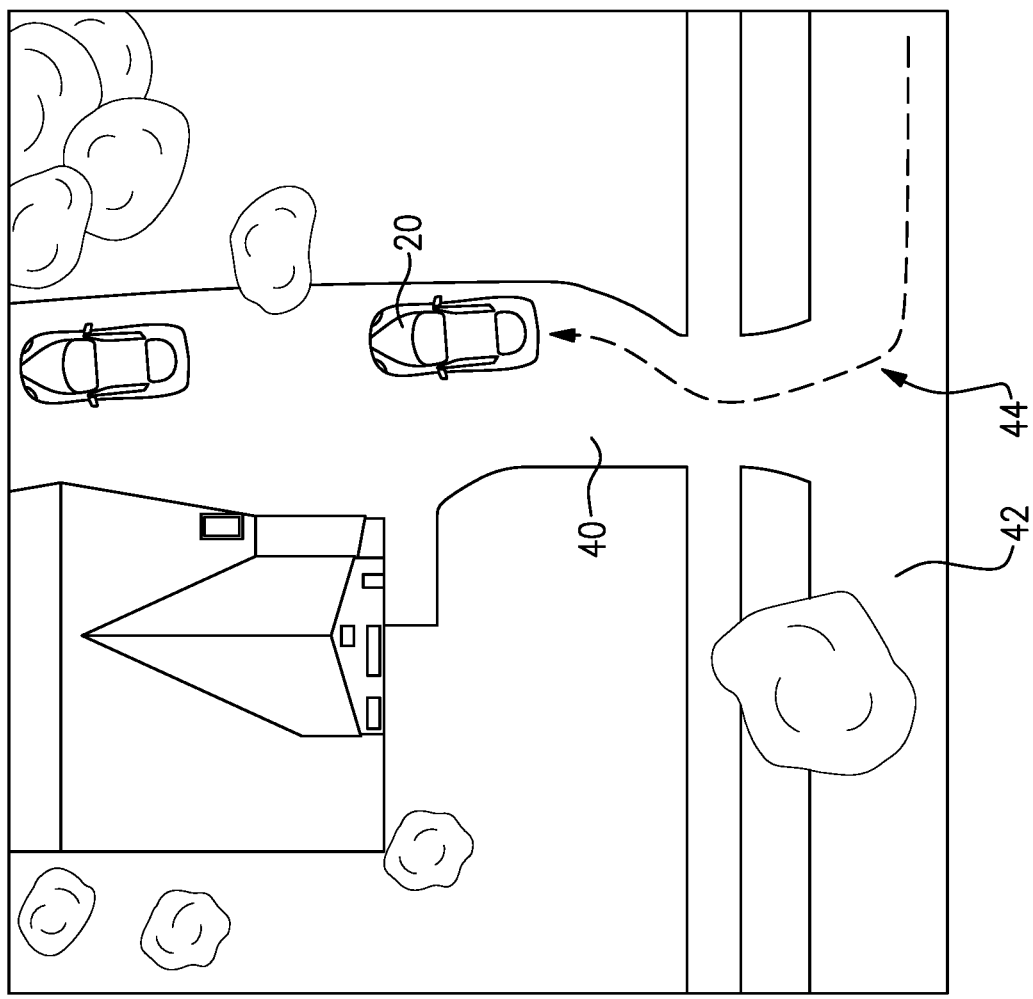
FIG. 2 is a schematic view of an example vehicle parked on a drivable surface of an example driveway.

Referring to FIG. 2 with continued reference to FIG. 1, the vehicle 20 is schematically shown in a driveway 40 after leaving a roadway 42. The driveway 40 is formed from a drivable surface. In this disclosure a drivable surface is that surface that is intended to provide for the operation of vehicles and may include concrete, blacktop and gravel. The example drivable surface does not include grass, dirt or any other surfaces that are not intended for operation of a vehicle. Moreover, the drivable surface is that surface that of the driveway that is not damaged by operation of the vehicle 20.

In this example, the vehicle 20 pulled into the driveway 40 from the roadway 42 along an entrance path 44 and then was shut off. For a driver that lives at the home adjacent the driveway 40, the contours and boundaries of the driveway are well known and familiar. However, for a visitor, the boundaries are not familiar and may be difficult to discern at night. Even the simple shape of the example driveway with a slight curve may be a challenge when backing out. The example driveway departure system 25 provides for backing out of the driveway 40 to the roadway. Once at the roadway, the vehicle operator would operate the vehicle normally with the satisfaction of knowing that the vehicle remained on the drivable surfaces and did not damage the surrounding non-drivable surfaces.

Figure 3:
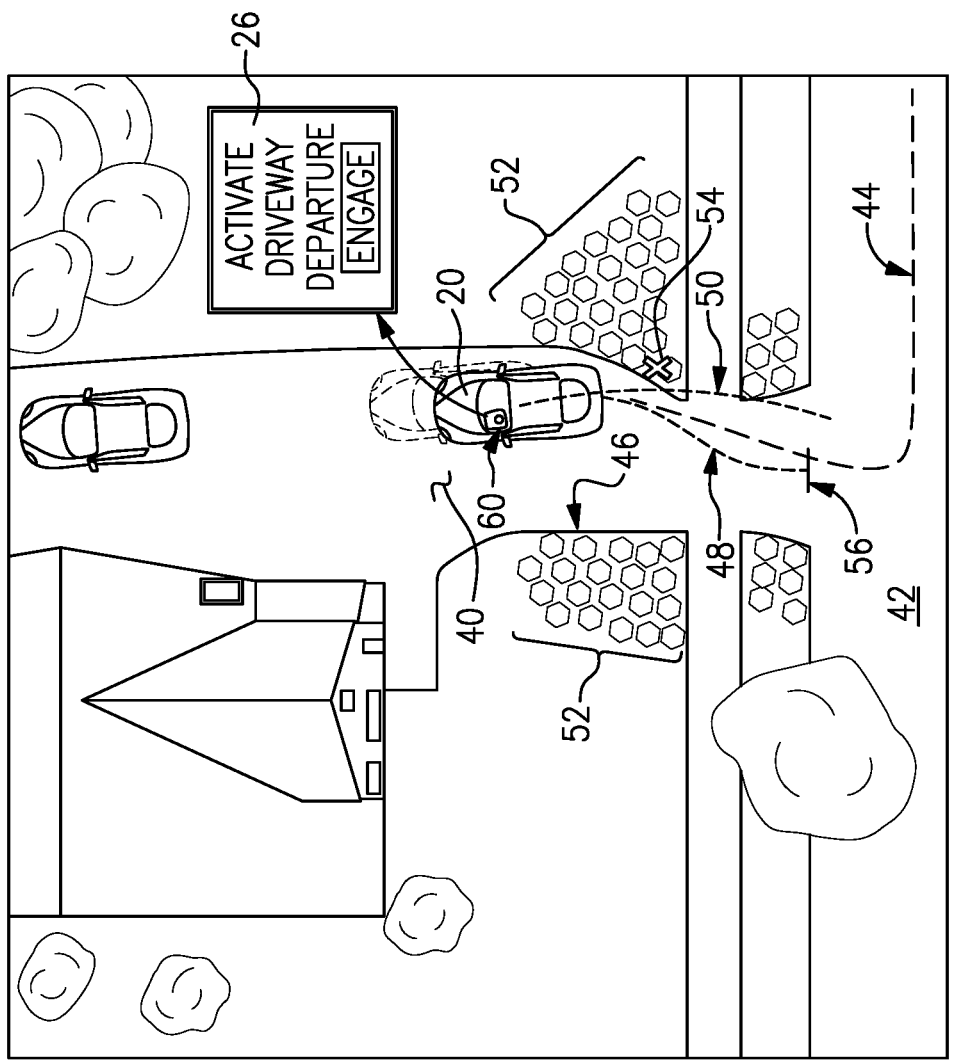
FIG. 3 is a schematic view of an example vehicle autonomously backing out of a driveway along a defined path for maintaining the vehicle along a drivable surface.

Referring to FIG. 3 with continued reference to FIG. 1, the vehicle 20 is shown in the initial process of backing out of the driveway 40. In this disclosed example, the operator 60 starts the vehicle and is presented with an option to activate the driveway departure system 25 by way of the display 26. The actuation of this query to the driver 60 can be prompted for each instance that the vehicle 20 is started or more specifically prompted in response to specific vehicle maneuvers that occurred just prior to the vehicle 20 being parked and shut down. For example, a low speed turn from a roadway 42 into the driveway just prior to shut down may prompt the query shown on the display 26.

Upon actuation by the driver 60, the system 25 detects drivable and non-drivable surfaces around the vehicle 20. The drivable surfaces include the driveway 40 and the roadway 42. The non-drivable surfaces are those surfaces such as grass along an edge of the driveway 40 that are indicated by the hexagon shapes 52. The radar devices 22 and the cameras 24 provide information on these surfaces to the controller 28 that generates a dynamic map defining the different surfaces around the vehicle 20. Although other structures and features may be along the driveway 40, the drivable surfaces of the driveway 40 and the non-drivable surfaces 52 adjacent the driveway are all that are utilized in forming the map.

Once the drivable surfaces 40 are defined, the system 25 determines a path for the vehicle to back out of the driveway 40 without leaving the drivable surfaces. The system 25 extrapolates the path using the current steering angle and other current vehicle orientations and conditions to predict if any of the wheels will roll onto a non-drivable surface or if the vehicle will collide with any obstacle on the path.

In this example, the defined path is indicated by dashed lines 48 and a current or actual path of the vehicle is set out as dashed line 50. As shown in FIG. 3, if the vehicle 20 maintains the actual path 50, a rear wheel of the vehicle will leave the drivable surface at the location indicated at 54. Accordingly, the drive departure system 25 will alter a steering angle of the front wheels to change the path to the defined path 48. The adjustment can be performed autonomously without driver input by operation or by prompting a course correction to be executed by the driver 60.

The defined path 48 may be determined from the data obtained regarding the drivable and non-drivable surfaces provided by the vehicle radar devices 22 and cameras 24. The defined path 48 may be determined by reversing the entrance path 44. Moreover, the defined path 48 may be determined by a combination of data from the vehicle sensors (radar devices 22 and cameras 24) arrays and the entrance path 44. The defined path 48 as a definite end point indicated at 56. The end point 56 is that point where the vehicle will stop and the operator will resume normal operation of the vehicle. The end point 56 is at the edge of the roadway 42 at a location suitable for stopping of the vehicle 20 prior to entering the roadway 42.

The vehicle 20 may then back out of the driveway 40 along the determined path 48. The vehicle 20 may be controlled by the driver 60 or autonomously operated to steer and back the vehicle to the end point 56.

Once at the end point 56, the system 25 can be automatically deactivated when the driver 60 starts to drive forward with a speed which is more than a specified threshold that signals termination of the departure maneuver.

The system 25 can also be used when the vehicle is towing a trailer. In some aspects of this invention, sensors mounted on a trailer can also be used to input the surrounding information to the system.

Figure 4:
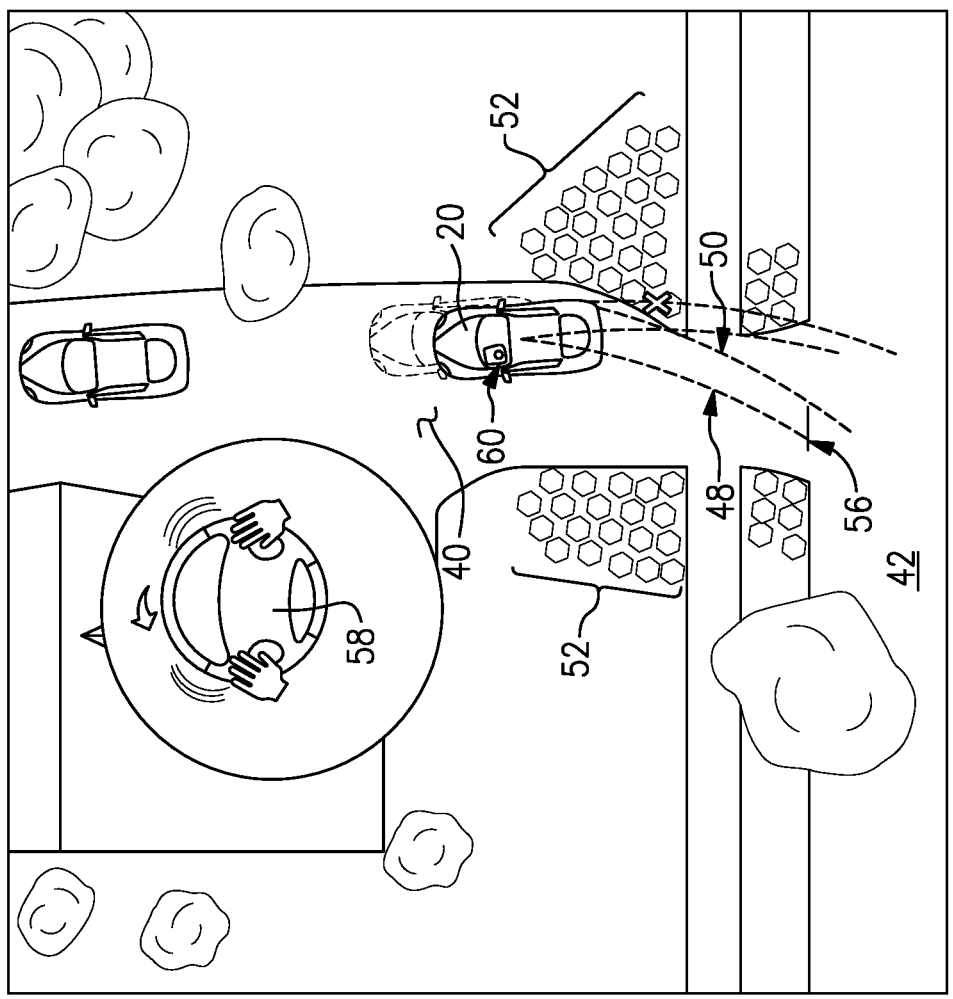
FIG. 4 is a schematic view of the example vehicle backing out of a driveway along a defined path with driver assistance.

Referring to FIG. 4 with continued reference to FIGS. 1 and 3, the example system 25 provides a prompt to the driver 60 to guide backing of the vehicle along the path 48. In this example, the prompt comprises haptic feedback through a steering wheel 58. A resistance may be applied to the steering wheel 58 to inhibit the driver 60 from straying from the defined path 48. In this example, the system 25 is providing feedback to the driver 60 such that the driver 60 maintains control of the vehicle 20 as it backs to the end pint 56. Other feedback may also be included such as audible or visual cues that alert the driver when the vehicle strays from the path 48 and is moving in a direction that may result in the vehicle 20 leaving the drivable surface of the driveway 40.

Figure 5:
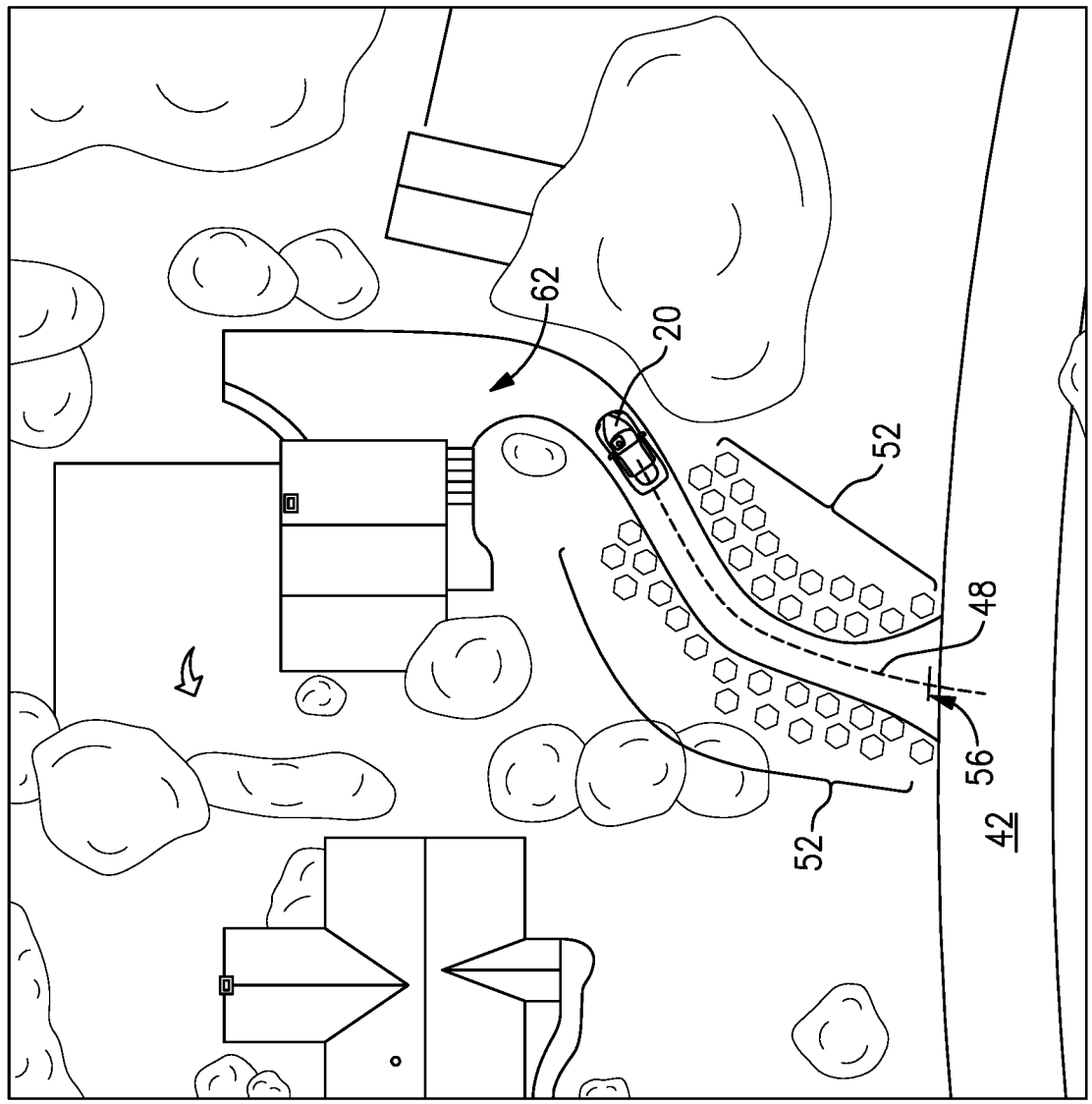
FIG. 5 is a schematic view of another example driveway and defined path for backing the vehicle from the driveway.

Referring to FIG. 5, another example driveway 62 is shown to illustrate an example of more challenging backup maneuvers that the disclosed system 25 addresses. The defined path 48 is winding to match the driveway 62 and prevent the vehicle from errantly driving on the non-drivable surfaces 52. As with the previous examples, the system 25 obtains information from the radar devices 22 and the cameras 24 to define a map of drivable and non-drivable surfaces around the vehicle. The defined map along with information on the entry path are used to define the exit path 48 that ends at the end point 56. The driver 60 will then either maneuver the vehicle 20 along the path 48 with the aid of feedback or allow the vehicle to autonomously back the vehicle 20 without drive input.

In either case, the path 48 is defined based on the detected drivable and non-drivable surfaces rather than defining a path that avoids detected objects such as a mailbox or vegetation. Detection of the drivable surfaces and planning of the defined path inherently results in avoidance of objects along the edges of a driveway.

Accordingly, the disclosed example driveway departure system assists drivers in the challenging task of backing a vehicle out of an unfamiliar or challenging driveway by defining a path that keeps the vehicle on drivable surfaces.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A driveway departure system for a vehicle comprising:
   a processing device comprising at least one processor circuit configured to define a path for backing the vehicle along a drivable surface of the driveway that maintains the vehicle on the drivable surface of the driveway and to operate a vehicle system to back the vehicle along the defined path and on the drivable surface,
   wherein the at least one processor circuit is further configured to generate a prompt to a vehicle operator responsive to turn on of the vehicle and based on a prior vehicle operation occurring prior to parking the vehicle and prior to shutting off the vehicle which f ollo wed the prior parking, the prior vehicle operation being indicative of the vehicle previously entering the driveway from a roadway at which an end of the driveway meets while at a speed below a threshold speed value so as to correspond to a low speed turn onto the driveway from the roadway, the prompt to the vehicle operator to activate the driveway departure system to define the path and operate the vehicle system along the defined path; and to deactivate the driveway departure system's operation of the vehicle system along the path in response to the vehicle driving forward above the threshold speed.

2. The driveway departure system as recited in claim 1, further comprising a sensor array configured to detect the drivable surface of a driveway and provide information on the drivable surface to the processing device.

3. The driveway departure system as recited in claim 2, wherein the at least one processor circuit of the processing device is further configured to generate of a map of objects and surfaces surrounding the vehicle and dynamically updating the map as the vehicle moves along the defined path.

4. The driveway departure system as recited in claim 1, wherein the at least one processor circuit of the processing device is further configured to autonomously controlling operation of the vehicle to back the vehicle out of the driveway along the defined path.

5. The driveway departure system as recited in claim 1, wherein the at least one processor circuit of the processing device is further configured to generate prompts to assist a driver in backing the vehicle out of the driveway along the defined path.

6. The driveway departure system as recited in claim 5, wherein the prompts to assist the driver include at least one of feedback through a steering wheel of the vehicle, projection of the defined path on a display device within the vehicle and actuation of a warning signal alerting the driver that the vehicle is deviating from the defined path.

7. The driveway departure system as recited in claim 1, wherein the at least one processor circuit is further configured to record a path taken by the vehicle when entering the driveway and the defining of the path for a departure of the vehicle based in part on the recorded path.

8. The driveway departure system as recited in claim 1, wherein the defined path comprises a path of departure that includes a defined end of the path at an end of the driveway and before entering an adjacent roadway.

9. A method of backing a vehicle departing a driveway, comprising:
   detecting a drivable surface of a driveway with a sensor disposed on a vehicle;
   defining, with at least one processor of a processing device disposed on the vehicle, a path for backing the vehicle from the driveway that maintains the vehicle on the detected drivable surface of the driveway;
   operating, by the at least one processor, a vehicle system to back the vehicle from the driveway on the defined path and on the detected drivable surface,
   providing, by the at least one processor, a prompt to a vehicle operator responsive to turning on of the vehicle and based on a prior vehicle operation occurring prior to parking the vehicle and prior to shutting off the vehicle which followed the prior parking, the prior vehicle operation being indicative of the vehicle previously entering the driveway from a roadway at which an end of the driveway meets while at a speed below a threshold speed value so as to correspond to a low speed turn onto the driveway from the roadway, the prompt to the vehicle operator to activate a driveway departure system to define the path and operate the vehicle system on the defined path; and
   deactivating, by the at least one processor, the driveway departure system's operation of the vehicle system along the path in response to the vehicle driving forward above the threshold speed.

10. The method of backing a vehicle departing a driveway as recited in claim 9, wherein the operating comprises autonomously controlling, by the at least one processor, the vehicle to back the vehicle out of the driveway along the defined path.

11. The method of backing a vehicle departing a driveway as recited in claim 9, wherein the operating comprises generating prompts, by the at least one processor, to assist a driver in backing the vehicle out of the driveway along the defined path.

12. The method of backing a vehicle departing a driveway as recited in claim 11, wherein the prompts to assist the driver include at least one of feedback through a steering wheel of the vehicle, a projection of the defined path on a display device within the vehicle, and a warning signal alerting the driver that the vehicle is deviating from the defined path.

13. The method of backing a vehicle departing a driveway as recited in claim 9, wherein the detecting of the drivable surface further comprises generating, by the at least one processor, a map of objects and surfaces surrounding the vehicle and dynamically updating the map as the vehicle moves along the defined path.

14. The method of backing a vehicle departing a driveway as recited in claim 9, wherein the sensor comprises an array of perception sensors disposed about the vehicle.

15. The method of backing a vehicle departing a driveway as recited in claim 9, further including recording, by the at least one processor, a path taken by the vehicle when entering the driveway and the defining, by the at least one processor, the path for departure of the vehicle from the driveway based in part on the recorded path.

16. The method of backing a vehicle departing a driveway as recited in claim 9, wherein the defining of the path comprises defining a path for departure including defining an end of the path at an end of the driveway and before entering an adjacent roadway.

17. The method of backing a vehicle departing a driveway as recited in claim 9, wherein the path is a path for departure which accommodates a trailer attached to the vehicle.

18. A software program product stored in a non-transitory medium and having software instructions which, when executed by at least one processor circuit, causes the at least one processor circuit to perform a method comprising:
   defining a path for backing the vehicle from the driveway that maintains the vehicle on a detected drivable surface of the driveway;
   operating a vehicle system to back the vehicle from the driveway on the defined path and on the detected drivable surface,
   providing a prompt to a vehicle operator responsive to turning on of the vehicle and based on a prior vehicle operation occurring prior to parking the vehicle and prior to shutting off the vehicle which followed the prior parking, the prior vehicle operation being indicative of the vehicle previously entering the driveway from a roadway at which an end of the driveway meets while at a speed below a threshold speed value so as to correspond to a low speed turn onto the driveway from the roadway, the prompt to the vehicle operator to activate a driveway departure system to define the path and operate the vehicle system on the defined path; and
deactivating the driveway departure system's operation of the vehicle system along the path in response to the vehicle driving forward above the threshold speed.

* * * * *